(12) United States Patent
Fister et al.

(10) Patent No.: US 11,989,737 B2
(45) Date of Patent: May 21, 2024

(54) METHODS AND SYSTEMS FOR DETERMINING THE AUTHENTICITY OF A COMPONENT

(71) Applicant: Lexmark International, Inc., Lexington, KY (US)

(72) Inventors: Zachary Nathan Fister, Lexington, KY (US); Nathan Wayne Foley, Lexington, KY (US); Timothy John Rademacher, Richmond, KY (US); Jennifer Topmiller Williams, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 295 days.

(21) Appl. No.: 17/371,211

(22) Filed: Jul. 9, 2021

(65) Prior Publication Data

US 2023/0015106 A1 Jan. 19, 2023

(51) Int. Cl.
*G06Q 10/10* (2023.01)
*G06Q 10/06* (2023.01)
*G06Q 10/0875* (2023.01)
*G06Q 30/018* (2023.01)
*G06Q 30/02* (2023.01)
*G06Q 30/06* (2023.01)
*G06T 7/00* (2017.01)
*H04L 9/08* (2006.01)
*H04L 9/32* (2006.01)
*H04L 9/00* (2022.01)

(52) U.S. Cl.
CPC ....... *G06Q 30/018* (2013.01); *G06Q 10/0875* (2013.01); *G06T 7/0008* (2013.01); *H04L 9/0869* (2013.01); *H04L 9/3242* (2013.01); *H04L 9/50* (2022.05)

(58) Field of Classification Search
CPC .............. G06Q 30/018; G06Q 10/0875; G06T 7/0008; H04L 9/0869; H04L 9/3242; H04L 9/50; H04L 9/0662; G06V 20/00
USPC .......................... 705/1.1–912, 50, 51, 62, 64
See application file for complete search history.

(56) References Cited

U.S. PATENT DOCUMENTS

| | | | |
|---|---|---|---|
| 2002/0154769 A1* | 10/2002 | Petersen | ................. G06F 7/586 380/42 |
| 2003/0023846 A1* | 1/2003 | Krishna | ................ G06F 21/604 713/162 |
| 2006/0265550 A1* | 11/2006 | Sakaguchi | .......... G06F 12/0866 711/170 |
| 2020/0004476 A1* | 1/2020 | Bush | ................... H04L 61/5038 |

* cited by examiner

*Primary Examiner* — Jonathan P Ouellette

(57) ABSTRACT

A method for determining the authenticity of an item, the method comprising: receiving, by an item, a seed; storing the seed in a block of non-volatile memory in the supply item follower component; calculating, by the item follower component, an output of a cryptographic function with the input based on the seed and storing the output in the block of non-volatile memory; iteratively calculating, by the item, the outputs of the cryptographic function wherein for each iteration the input for the cryptographic function is based on the seed and all previous outputs, and for each iteration storing the output in the block of non-volatile memory; and determining the authenticity of the item based on a selected output of the cryptographic function of the item, the selected output being one of the outputs stored in the block of non-volatile memory.

18 Claims, 3 Drawing Sheets

METHODS AND SYSTEMS FOR DETERMINING THE AUTHENTICITY OF A COMPONENT

CROSS REFERENCE TO RELATED APPLICATIONS

None.

BACKGROUND

1. Technical Field

The present disclosure generally relates to methods and systems for determining the authenticity of a component, and, more particularly, methods and systems for determining the authenticity of a supply item component within an imaging device.

2. Description of the Related Art

In electronic systems, it is often desirable to confirm the authenticity of a component of the electronic system to ensure that the entire system operates as designed. Non-authentic components employ various techniques to mimic the behavior of authentic components. This may include copying the authentic component's circuits and memory contents in order to duplicate authentication algorithms or encrypted communication between the component and the rest of the electronic system. This is particularly important in printing systems where it is desirable to confirm the authenticity of a supply component of the printing system to ensure correct operation.

Non-authentic components may utilize different resources than an authentic component in order to accomplish similar behavior. For example, an encryption scheme done via a hardware circuit on the authentic component may be implemented on a non-authentic component via firmware running on a programmable microcontroller. This makes it easier to produce a non-authentic component which passes as an authentic component.

Accordingly, there is a need for improved systems and methods for determining the authenticity of a component to thwart the use of non-authentic components.

SUMMARY

The present disclosure provides example methods and systems that may be implemented in any general electronic system or specifically in an imaging/printing device/system to thwart the use of non-authentic components.

There is provided a method for determining the authenticity of a supply item in an imaging device, the method comprising: receiving, by a supply item follower component in the supply item communicatively connected to an imaging device leader component in the imaging device, a seed; storing the seed in a block of non-volatile memory in the supply item follower component; calculating, by the supply item follower component, an output of a cryptographic function with the input based on the seed and storing the output in the block of non-volatile memory; iteratively calculating, by the supply item follower component, the outputs of the cryptographic function wherein for each iteration the input for the cryptographic function is based on the seed and all previous outputs, and for each iteration storing the output in the block of non-volatile memory; and determining the authenticity of the supply item based on a selected output of the cryptographic function of the supply item follower component, the selected output being one of the outputs stored in the block of non-volatile memory.

In certain implementations, the inputs for the iterative calculations of the cryptographic function are a concatenation/are based on a concatenation of the seed and all previous outputs. Optionally, the concatenation may be in the reverse order of the outputs and ending with the seed (e.g. $D_i \| D_{i-1} \| \ldots D_0 \|$ seed, where i represents the iteration, i=0 being the first iteration and i being the last iteration, $D_i$=F $(D_{i-1} \| D_{i-2} \mu \ldots D_0 \|$ seed), and where $\|$ represents a concatenation).

In certain implementations, the step of calculating, by the supply item follower component, an output of the cryptographic function with the input based on the seed comprises calculating one or more cycles of the cryptographic function, where for each cycle the input to the cryptographic function is the previous output thereof.

In certain implementations, the step of iteratively calculating, by the supply item follower component, the outputs of the cryptographic function comprises, for each iteration, calculating one or more cycles of the cryptographic function, where for each cycle the input to the cryptographic function is the previous output thereof.

In certain implementations, the method further comprises calculating, by an imaging device component in the imaging device, the output of the cryptographic function based on the seed in the same manner as the calculation by the supply item follower component, and storing the output in a block of non-volatile memory in the imaging device component; and iteratively calculating, by the imaging device component, the outputs of the cryptographic function wherein for each iteration the input for the cryptographic function is based on the seed and all previous outputs in the same manner as the calculation by the supply item follower component, and for each iteration storing the output in the block of non-volatile memory of the imaging device component, wherein the number of iterations of the calculation of the cryptographic function performed by the supply item follower component is the same as the number of iterations of the calculation of the cryptographic function performed by the imaging device component, and wherein determining the authenticity of the supply item comprises comparing the selected output of the cryptographic function of the supply item follower component with the corresponding output of the cryptographic function of the imaging device component to determine if they are the same.

In certain implementations, the imaging device component is an imaging device follower component in the imaging device communicatively connected to the imaging device leader component.

In certain implementations, the imaging device component is the imaging device leader component.

In certain implementations, upon a determination that the selected output of the cryptographic function of the supply item follower component is the same as the corresponding output of the cryptographic function of the imaging device component, the supply item is identified as an authentic supply item, and wherein upon a determination that the selected output of the cryptographic function of the supply item follower component is different from the corresponding output of the cryptographic function of the imaging device component, the supply item is identified as a non-authentic supply item. Optionally, upon identification that the supply item is non-authentic, the imaging device is configured to take an action, for example, prevent further use of features of the imaging device and/or display a notification that a verification error has occurred. Optionally, a user may be advised to acquire an authorized supply device via a display of user interface or to contact a system administrator or technical support for assistance in addressing the issue.

In certain implementations, determining the authenticity of the supply item comprises comparing a threshold time with the total time taken to determine all iterations up to and including the selected iteration of the calculation of the cryptographic function performed by the supply item follower component, wherein upon a determination that the total time is less than or equal to the threshold time, the supply item is identified as an authentic supply item, and wherein upon a determination that the total time is greater than the threshold time, the supply item is identified as a non-authentic supply item.

In certain implementations, determining the authenticity of the supply item comprises: the imaging device component requesting the selected output from the supply item follower component; upon receiving the request from the imaging device component, the supply item follower component transmitting the selected output to the imaging device component; and the imaging device component comparing a threshold time with the total time taken to receive the selected output from the supply item follower component after the request from the imaging device component, wherein upon a determination that the total time is less than or equal to the threshold time, the supply item is identified as an authentic supply item, and wherein upon a determination that the total time is greater than the threshold time, the supply item is identified as a non-authentic supply item.

In certain implementations, upon the supply item follower component receiving the request from the imaging device component the supply item follower component retrieves the existing stored selected output which is stored in the block of non-volatile memory of the supply item follower component.

In certain implementations, upon the supply item follower component receiving the request from the imaging device component the supply item follower component retrieves the existing stored selected output which is stored in the block of non-volatile memory of the supply item follower component without calculating the selected output.

In certain implementations, iteratively calculating, by the supply item follower component, the outputs of the cryptographic function stops when the block of non-volatile memory in the supply item follower component is full.

In certain implementations, iteratively calculating, by the supply item follower component, the outputs of the cryptographic function comprises looping around to start a new chain when the block of non-volatile memory in the supply item follower component is full.

In certain implementations, the cryptographic function is one of a hash function, a salted hash function, a keyed-hash message authentication code, and an encryption function.

In certain implementations, the imaging device leader component sends an authentication request to the supply item follower component triggering it to perform the calculations. Optionally, the authentication request may be sent upon a Power on Reset (POR). Optionally, the authentication request may be sent upon the supply item being installed in the imaging device.

In certain implementations, the supply item follower component sends an encryption of the selected output of the cryptographic function to the imaging device leader component. In certain implementations, the supply item follower component sends a hash (e.g. keyed hash) of the selected output of the cryptographic function to the imaging device leader component.

In certain implementations, the method further comprises the supply item follower component changing the size of the block of non-volatile memory in the supply item follower component.

In certain implementations, the imaging device component generates a new seed periodically.

In certain implementations, the imaging device component generates a new seed when the supply item is detected in the imaging device.

In certain implementations, the imaging device leader component generates a new seed periodically.

In certain implementations, the imaging device leader component generates a new seed when the supply item is detected in the imaging device.

In certain implementations, the calculations of cryptographic function are hardware accelerated in the supply item follower component.

There is further provided an imaging system comprising: an imaging device having an imaging device leader component; and a supply item having a supply item follower component communicatively connectable to the imaging device leader component, the supply item follower component being configured to: receive a seed; store the seed in a block of non-volatile memory in the supply item follower component; calculate the output of a cryptographic function with the input of the seed and store the output in the block of non-volatile memory; and iteratively calculate the outputs of the cryptographic function wherein for each iteration the input for the cryptographic function is the seed and all previous outputs, and for each iteration store the output in the block of non-volatile memory, wherein the imaging device is configured to determine the authenticity of the supply item based on a selected output of the cryptographic function of the supply item follower component, the selected output being one of the outputs stored in the block of non-volatile memory.

In certain embodiments, the imaging device further comprises an imaging device component, the imaging device component being configured to: calculate the output of the cryptographic function with the input of the seed and store the output in a block of non-volatile memory in the imaging device component; and iteratively calculate the outputs of the cryptographic function wherein for each iteration the input for the cryptographic function is the seed and all previous outputs, and for each iteration store the output in the block of non-volatile memory of the imaging device component, wherein the number of iterations of the calculation of the cryptographic function performed by the supply item follower component is the same as the number of iterations of the calculation of the cryptographic function performed by the imaging device component, and wherein determining the authenticity of the supply item comprises comparing the selected output of the cryptographic function of the supply item follower component with the corresponding output of the cryptographic function of the imaging device component to determine if they are the same.

In certain embodiments, the imaging device component is an imaging device follower component in the imaging device communicatively connected to the imaging device leader component.

In certain embodiments, the imaging device component is the imaging device leader component.

There is also provided a method for determining the authenticity of a component in an electronic device, the method comprising: receiving a seed by a component in the electronic device; storing the seed in a block of non-volatile memory in the component; calculating, by the component, the output of a cryptographic function with the input based on the seed and storing the output in the block of non-volatile memory; iteratively calculating, by the component, the outputs of the cryptographic function wherein for each iteration the input for the cryptographic function is based on the seed and all previous outputs, and for each iteration storing the output in the block of non-volatile memory; and determining the authenticity of the component based on a selected output of the cryptographic function F, the selected output being one of the outputs stored in the block of non-volatile memory.

In certain implementations, the method further comprises calculating, by a second component, the output of the cryptographic function with the input based on the seed in the same manner as the calculation by the component; and iteratively calculating, by the second component, the outputs of the cryptographic function wherein for each iteration the input for the cryptographic function is based on the seed and all previous outputs in the same manner as the calculation by the component, wherein the number of iterations of the calculation of the cryptographic function performed by the component is the same as the number of iterations of the calculation of the cryptographic function performed by the second component, and wherein determining the authenticity of the component comprises comparing the selected output of the cryptographic function of the component with the corresponding output of the cryptographic function of the second component to determine if they are the same.

In certain implementations, upon a determination that the selected output of the cryptographic function of the component is the same as the corresponding output of the cryptographic function of the second component, the component is identified as an authentic component, and wherein upon a determination that the selected output of the cryptographic function of the component is different from the corresponding output of the cryptographic function of the second component, the component is identified as a non-authentic component.

In certain implementations, the output of the cryptographic function with the input based on the seed is stored in a block of non-volatile memory in the second component.

In certain implementations, each of the iterative outputs of the cryptographic function with the input being based on the seed and all previous outputs is stored in a block of non-volatile memory in the second component.

In certain implementations, the component transmits the selected output to the second component, and wherein step of determining the authenticity of the component is carried out by the second component.

In certain implementations, determining the authenticity of the component comprises the second component requesting the selected output from the component; upon receiving the request from the second component, the component transmitting the selected output to the second component; and the second component comparing a threshold time with the total time taken to receive the selected output from the component after the request from the second component, wherein upon a determination that the total time is less than or equal to the threshold time, the component is identified as an authentic supply item, and wherein upon a determination that the total time is greater than the threshold time, the component is identified as a non-authentic supply item.

In certain implementations, upon the component receiving the request from the second component the component retrieves the existing stored selected output which is stored in the block of non-volatile memory of the component.

In certain implementations, the electronic device is an imaging/printing device.

In certain implementations, the component is a supply item component, for example, a supply item follower component.

In certain implementations, second component is an imaging device component, for example, an imaging device leader component or an imaging device follower component.

There is further provided an electronic device comprising a component, the component configured to: receive a seed; store the seed in a block of non-volatile memory in the component; calculate the output of a cryptographic function with the input based on the seed and store the output in the block of non-volatile memory; and iteratively calculate the outputs of the cryptographic function wherein for each iteration the input for the cryptographic function is based on the seed and all previous outputs, and for each iteration store the output in the block of non-volatile memory, wherein the electronic device is configured to determine the authenticity of the component based on a selected output of the cryptographic function F, the selected output being one of the outputs stored in the block of non-volatile memory.

In certain embodiments, the electronic device further comprises a second component configured to: calculate the output of the cryptographic function with the input based on the seed in the same manner as the calculation by the component; and iteratively calculate the outputs of the cryptographic function wherein for each iteration the input for the cryptographic function is based on the seed and all previous outputs in the same manner as the calculation by the component, wherein the number of iterations of the calculation of the cryptographic function performed by the component is the same as the number of iterations of the calculation of the cryptographic function performed by the second component, and wherein determining the authenticity of the component comprises comparing the selected output of the cryptographic function of the component with the corresponding output of the cryptographic function of the second component to determine if they are the same.

In certain embodiments, the second component is configured to store the output of the cryptographic function with the input based on the seed in a block of non-volatile memory in the second component.

In certain embodiments, the second component is configured to store each of the iterative outputs of the cryptographic function with the input being based on the seed and all previous outputs in a block of non-volatile memory in the second component.

In certain embodiments, the component is configured to transmit the selected output to the second component, and wherein step of determining the authenticity of the component is carried out by the second component.

In certain embodiments, the second component is configured to request the selected output from the component; the component is configured to, upon receiving the request from the second component, transmit the selected output to the second component; and the second component is configured to compare a threshold time with the total time taken to receive the selected output from the component after the request from the second component.

In certain embodiments, the component is configured to, upon receiving the request from the second component, retrieve the existing stored selected output which is stored in the block of non-volatile memory of the component.

There is yet further provided a method of determining the authenticity of a component in an electronic device using a second component of the electronic device, the method comprising: iteratively calculating, by the second component, a series of outputs of a cryptographic function, wherein for each iteration the input for the cryptographic function is based on all previous outputs of the cryptographic function; the second component requesting a selected output from the component, the selected output corresponding to an output of the iterative calculation of the cryptographic function performed by the second component; upon receiving the request from the second component, the component transmitting the selected output to the second component; and the second component comparing the selected output received from the component with the corresponding selected output calculated by the iterative calculation of the cryptographic function performed by the second component.

In certain implementations, the second component stores each output of the cryptographic function in a block of non-volatile memory of the second component.

In certain implementations, the method comprises iteratively calculating, by the component, the series of outputs of the cryptographic function, wherein for each iteration the input for the cryptographic function is based on all previous outputs of the cryptographic function, and wherein for each iteration the component stores each output of the cryptographic function in a block of non-volatile memory of the component.

In certain implementations, upon the component receiving the request from the second component the component retrieves the existing stored selected output which is stored in the block of non-volatile memory of the component.

In certain implementations, the method further comprises the second component comparing a threshold time with the total time taken to receive the selected output from the component after the request from the second component, wherein upon a determination that the total time is less than or equal to the threshold time, the component is identified as an authentic component, and wherein upon a determination that the total time is greater than the threshold time, the component is identified as a non-authentic component.

There is also provided a method of determining the authenticity of a component in an electronic device, the method comprising: iteratively calculating, by the component, a series of outputs of a cryptographic function, wherein for each iteration the input for the cryptographic function is based on all previous outputs of the cryptographic function, and for each iteration storing the output in a block of non-volatile memory of the component.

There is further provided an electronic device comprising a component, the component configured to iteratively calculate a series of outputs of a cryptographic function, wherein for each iteration the input for the cryptographic function is based on all previous outputs of the cryptographic function, and for each iteration store the output in a block of non-volatile memory of the component.

In any of the implementations/embodiments described herein, the components (e.g. the various leader/follower components) may be connected via any shared bus, such as I2C.

From the foregoing disclosure and the following detailed description of various examples, it will be apparent to those skilled in the art that the present disclosure provides a significant advance in the art of determining the authenticity of a component an electronic system. Additional features and advantages of various examples will be better understood in view of the detailed description provided below.

As used herein, the term 'leader' is equivalent to the term 'master' and can be used interchangeably throughout without changing the meaning. As used herein, the term 'follower' is equivalent to the term 'slave' and can be used interchangeably throughout without changing the meaning. Both terms 'master' and 'slave' take their usual meanings in the art, for example, as used in the official I2C specification.

BRIEF DESCRIPTION OF THE DRAWINGS

The above-mentioned and other features and advantages of the present disclosure, and the manner of attaining them, will become more apparent and will be better understood by reference to the following description of examples taken in conjunction with the accompanying drawings. Like reference numerals are used to indicate the same element throughout the specification.

DETAILED DESCRIPTION OF THE DRAWINGS

Figure 1:
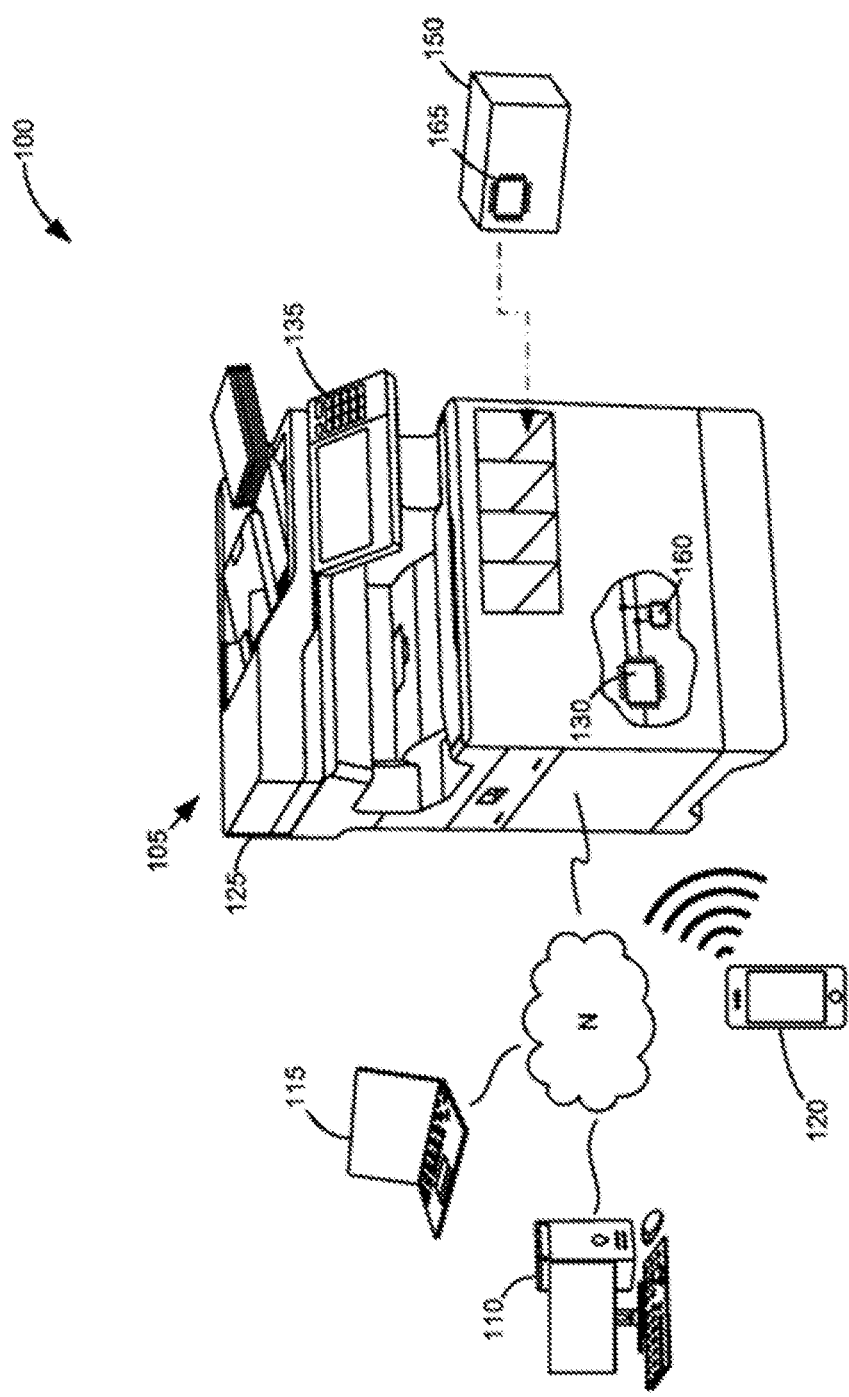
FIG. 1 is a diagrammatic view of an imaging system.

It is to be understood that the disclosure is not limited to the details of construction and the arrangement of components set forth in the following description or illustrated in the drawings. The disclosure is capable of other examples and of being practiced or of being carried out in various ways. For example, other examples may incorporate structural, chronological, process, and other changes. Examples merely typify possible variations. Individual components and functions are optional unless explicitly required, and the sequence of operations may vary. Portions and features of some examples may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that examples of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps or combinations of special purpose hardware and computer instructions.

Disclosed are example systems and methods for determining the authenticity of a component in an electronic system, such as an imaging/printer system.

Referring to FIG. 1, there is shown a diagrammatic view of an imaging system 100 used in association with the present disclosure. Imaging system 100 includes an imaging device 105 used for printing images on sheets of media. Image data of the image to be printed on a media sheet may be supplied to imaging device 105 from a variety of sources such as a computer 110, laptop 115, mobile device 120, scanner 125 of the imaging device 105, or like computing device. The sources directly or indirectly communicate with imaging device 105 via wired and/or wireless connections.

Imaging device 105 includes an imaging device leader component 130 and a user interface 135. Imaging device leader component 130 may include a processor and associated memory. In some examples, imaging device leader component 130 may be formed as one or more Application Specific Integrated Circuits (ASICs) or System-on-Chip (SoCs). Memory may be any memory device which stores data and may be used with or capable of communicating with processor. For example, memory may be any volatile or non-volatile memory or combination thereof such as, for example, random access memory (RAM), read-only memory (ROM), flash memory and/or non-volatile RAM (NVRAM) for storing data. Optionally, imaging device leader component 130 may control the processing of print data. Optionally, imaging device leader component 130 may also control the operation of a print engine during printing of an image onto a sheet of media.

In one example, imaging device 105 may employ an electronic authentication scheme to authenticate consumable supply items and/or replaceable units installed in imaging device 105. In FIG. 1, a representative consumable supply item/replaceable item, such as a toner cartridge 150, is shown (other consumable/replaceable supply items can equally be used in addition or instead, such as imaging units and fusers). Supply item 150 may be installed in a corresponding storage area in imaging device 105. To perform authentication of supply item 150, imaging device 105 may utilize an imaging device follower component 160 incorporated in imaging device 105 and a supply item follower component 165 of supply item 150.

Both imaging device follower component 160 in imaging device 105 and supply item follower component 165 in supply item 150 may be configured as follower devices that connect to imaging device leader component 130, the imaging device leader component 130 being configured to act as a leader device. In one example, imaging device follower component 160 in imaging device 105 may be similar to or the same as supply item follower component 165 in consumable supply item 150. Optionally, the imaging device follower component 160 may be programmed differently from supply item follower component 165. Imaging device follower component 160 and supply item follower component 165 may operate in conjunction with imaging device leader component 130 to perform authentication functions, as will be explained in greater detail below.

Figure 2:
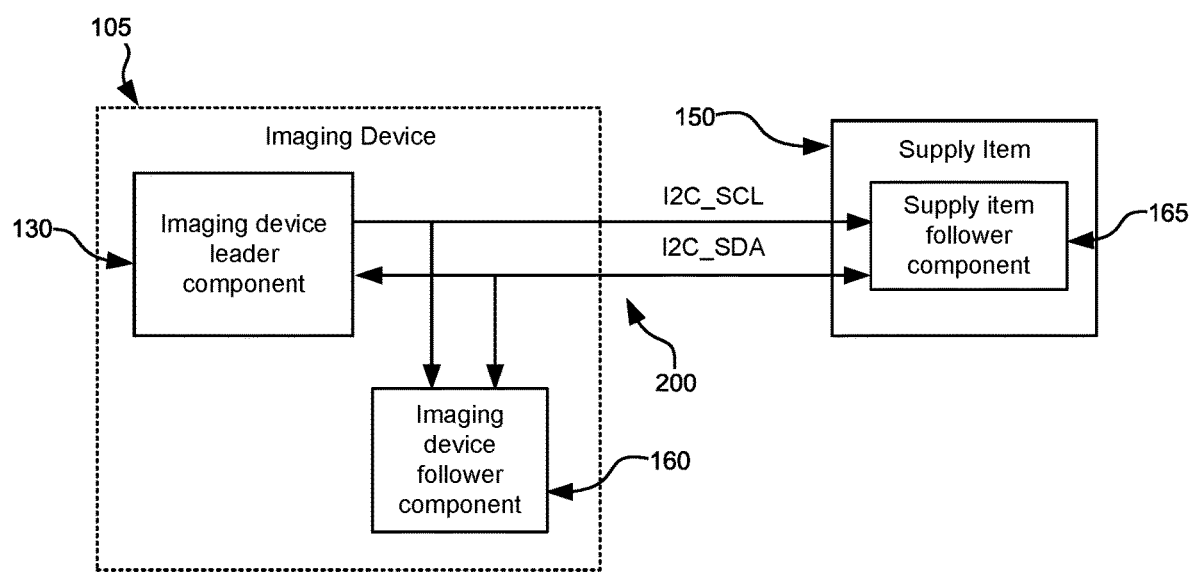
FIG. 2 is a block diagram depicting part of the imaging device of FIG. 1.

FIG. 2 is a block diagram depicting imaging device 105 and supply item 150. In this example, a shared bus system 200 may be employed to control various subassemblies and components (such as supply item 150) and/or obtain status reports thereof. The shared bus system 200 may be an Inter-Integrated Circuit (I2C) interface comprising a serial clock line (SCL) and serial data line (SDA). Various components such as an imaging unit, a toner cartridge 150, and other follower or supply devices and/or addressable components and subassemblies capable of receiving and/or handling data such as a fuser, a laser scan unit, and a media feed mechanism, may be connected to shared bus system 200 (for simplicity FIG. 2 only shows supply item 150 connected to the shared bus system 200). Imaging device leader component 130 may be generally configured to control a bus leader, which acts as the leader of the shared bus system 200. The bus leader may be implemented as firmware of the imaging device leader component 130.

Imaging device follower component 160 may operate in conjunction with bus leader to facilitate establishing connections between imaging device leader component 130 and various components and subassemblies (such as supply item 150) connected to shared bus system 200. For example, imaging device follower component 160 may be configured to provide authentication functions, safety and operational interlocks, and/or address change functions related to supply item 150 and other addressable components.

In general, both the imaging device follower component 160 and supply item follower component 165 are configured to perform the same cryptographic function F and the results of the calculation of the cryptographic function F are compared to determine the authenticity of the supply item follower component 165 and therefore the supply item 150. This is described further below.

The supply item follower component 165 may comprise non-volatile memory (NVM). The non-volatile memory may include a block of memory allocated to the calculation of the cryptographic function F.

The imaging device follower component 160 may also comprise non-volatile memory (NVM). The non-volatile memory may include a block of memory allocated to the calculation of the cryptographic function F.

The NVM of the supply item follower component 165 and the NVM of the imaging device follower component 160 may have the same total size. Additionally/alternatively, the block of NVM of the supply item follower component 165 and the block of NVM of the imaging device follower component 160 may have the same total size.

The imaging device 105 may attempt to authenticate the supply item 150 at any point, for example, at fixed time intervals. Additionally/alternatively, the imaging device 105 may attempt to authenticate the supply item 150 shortly after a Power On Reset (POR) or shortly after the supply item 150 is installed in the imaging device. The below describes a method/system for verifying the authenticity of supply item 150 upon request from the imaging device 105.

Figure 3:
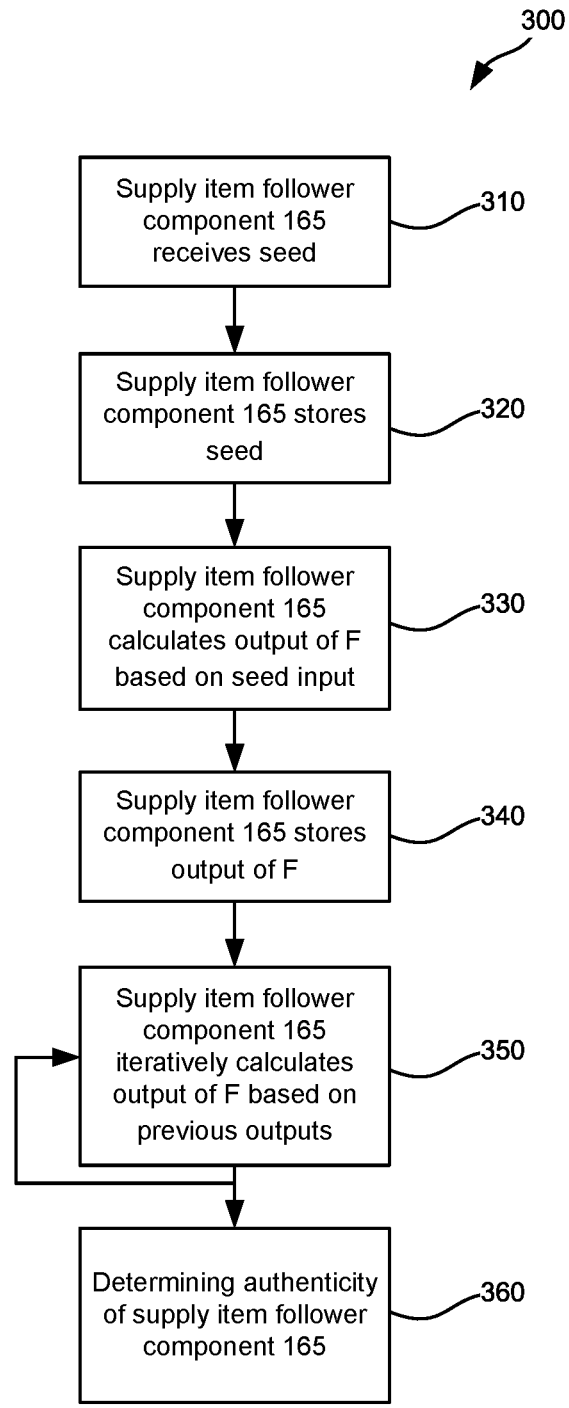
FIG. 3 is a flow diagram illustrating a method associated with the imaging device of FIG. 1.

Specifically, a method 300 of verifying the authenticity of the supply item 150 is detailed below with reference to FIG. 3. The method 300 may be implemented using the arrangement/configuration described in relation to FIG. 1 and/or FIG. 2.

In block 310, the supply item follower component 165 receives a seed. The seed may be stored in the imaging device follower component 160 and/or generated dynamically by the imaging device follower component 160. The seed may be received by the supply item follower component 165 from the imaging device follower component 160.

In block 320, the supply item follower component 165 may store the seed in its block of NVM allocated to the calculation of the cryptographic function F. The seed may be stored at the top/bottom of the block of NVM, or at any other location. The block of NVM is representatively shown below, where, in this example, the block has been filled starting from the top of the block of NVM:

| Memory Address | Memory Data |
|---|---|
| 0 | |
| ... | |
| $A_{seed}$ | seed |

In block 330, the supply item follower component 165 calculates the output of cryptographic function F with the input of the seed, and in block 340 stores the calculated output in the block of NVM, together with the stored seed (e.g. without overwriting/deleting the stored seed from the block of NVM). The block of NVM after this step is representatively shown below, where $D_0$=F(seed) and L is the output length of cryptographic function F:

| Memory Address | Memory Data |
|---|---|
| 0 | |
| ... | |
| $A_{seed} - L$ | $D_0$ |
| $A_{seed}$ | seed |

In block 350, the supply item follower component 165 iteratively calculates further outputs of cryptographic function F. For each iteration, the output of cryptographic function F is stored in the block of NVM, together with the stored seed and all previous stored outputs of cryptographic function F (e.g. without overwriting/deleting the stored seed/previous stored outputs from the block of NVM). For each iteration of the calculation of cryptographic function F the input is based on the seed and all previous stored outputs of cryptographic function F. The block of NVM after an iteration i is representatively shown below, where, in this example, $D_i=F(D_{i-1}\mu D_{i-2}\| \ldots D_0\|seed)$, and where $\|$ represents a concatenation:

| Memory Address | Memory Data |
|---|---|
| 0 | |
| ... | |
| $A_{seed} - (i + 1)L$ | $D_i$ |
| ... | ... |
| $A_{seed} - 3L$ | $D_2$ |
| $A_{seed} - 2L$ | $D_1$ |
| $A_{seed} - L$ | $D_0$ |
| $A_{seed}$ | seed |

In this example, the seed and previous outputs are concatenated in reverse order (i.e. the latest output is the first part of the concatenation and the seed is the last part). With such a reverse order, it becomes more difficult for a non-genuine component to replicate the desired result as every iteration includes an entirely new input string as opposed to the new string being simply extended form the previous string. This ultimately results in the non-genuine component needing to have higher processing power and larger memory (both volatile and non-volatile).

The iterative calculations in block 350 may continue until the block of NVM is full, or for a predetermined amount of time.

In block 360, the authenticity of supply item follower component 165 is determined based on a selected output or selected outputs of the cryptographic function F of the supply item follower component 165, the selected output(s) being from the outputs stored in the block of NVM. The authentication of supply item follower component 165 based on the output(s) of the cryptographic function F can be carried out in different ways. For example, the stored selected output(s) of the supply item follower component 165 may be compared with corresponding output(s) from the imaging device leader component 130 and/or the imaging device follower component 160. These corresponding output(s) may be stored upon manufacturing (e.g. when a fixed seed is used) or may be calculated by the imaging device follower component 160 upon request (e.g. when a changing seed is used).

Specifically, in the situation where the corresponding output(s) are calculated, the imaging device follower component 160 may contain the same or similar hardware and software as the supply item follower component 165 and may be configured to generally follow the same steps as the supply item follower component 165. Specifically, the imaging device follower component 160 may: store the seed in its block of NVM allocated to the calculation of the cryptographic function F; calculate the output of cryptographic function F with the input of the seed; store the calculated output in the block of NVM, together with the stored seed (e.g. without overwriting/deleting the stored seed from the block of NVM); iteratively calculate outputs of cryptographic function F, where, for each iteration, the output of cryptographic function F is stored in the block of NVM, together with the stored seed and all previous stored outputs of cryptographic function F (e.g. without overwriting/deleting the stored seed/previous stored outputs from the block of NVM), and for each iteration of the calculation of cryptographic function F, the input is based on the seed and all previous stored outputs of cryptographic function F.

In this manner, the supply item follower component 165 and the imaging device follower component 160 perform that same set of calculations using the same cryptographic function F. The results of the imaging device follower component 160 are assumed to be genuine (as this component is part of the imaging device 105) and therefore the stored outputs of the supply item follower component 165 can be compared with the corresponding outputs of the imaging device follower component 160 to determine whether they match. If the compared output(s) matches, the supply item follower component 165 (and therefore the supply item 150) may be considered authentic. If the compared output(s) does not match, the supply item follower component 165 (and therefore the supply item 150) may be considered non-authentic.

Additionally/alternatively to comparing selected output(s) for a match, in block 360, the method may compare a predetermined threshold time (e.g. stored within the imaging device leader component 130 and/or the imaging device follower component 160) with the total time taken to determine all iterations up to and including a selected iteration of the calculation of the cryptographic function F performed by the supply item follower component 165. Upon a determination that the total time is less than or equal to the threshold time, the supply item follower component 165 may be identified as an authentic component. Upon a determination that the total time is greater than the threshold time, the supply item follower component 165 may be identified as a non-authentic component.

Additionally/alternatively to comparing selected output(s) for a match, in block 360, the method may compare a predetermined threshold time (e.g. stored within the imaging device leader component 130 and/or the imaging device follower component 160) with the total time taken to retrieve a selected stored output or selected stored outputs from the NVM of the supply item follower component 165. For example, block 360 may include the supply item follower component 165 receiving a request to transmit a selected output (or outputs), the supply item follower component 165 transmitting the requested selected output(s), and the imaging device follower component 160 measuring the time taken to receive the result from the supply item follower component 165.

Upon a determination that the total time is less than or equal to the threshold time, the supply item follower component 165 may be identified as an authentic component. Upon a determination that the total time is greater than the threshold time, the supply item follower component 165 may be identified as a non-authentic component.

With the imaging device follower component 160 checking the time taken for the supply item follower component 165 to return the requested selected output(s), the threshold time may be set such that calculating the selected output(s) would mean that the threshold time would be exceeded (and therefore the supply item follower component 165 being identified as non-authentic), whereas if the selected output(s) were retrieved from NVM of the supply item follower component 165 the threshold time may be satisfied (and therefore the supply item follower component 165 can be identified as authentic). In this manner, if counterfeiters are to replicate satisfy the time threshold, they must include a large NVM which increases complexity of the counterfeit component (and cost).

With such configurations/implementations, the cryptographic function F is calculated on increasing amounts of input data as each successive calculation/iteration has an input based on all previous outputs of the cryptographic function F. Accordingly, the supply item follower component 165 (and the imaging device follower component 160) require greater amounts of processing power and writeable memory (both volatile and non-volatile memory). These features make it more complicated (and expensive) to produce a counterfeit component.

The above has been described in relation to a specific implementation/embodiment. However, modifications can be implemented within the scope of the application, some of which are detailed below.

For example, in the above, the imaging device 105 includes an imaging device leader component 130 and an imaging device follower component 160, where the imaging device follower component 160 is configured to carry out the same calculations as the supply item follower component 165. In a modification, the imaging device follower component 160 may be omitted and the imaging device leader component 130 instead carries out all of the authentication steps (i.e. calculates the same calculations as the supply item follower component 165 and compares the calculations of the supply item follower component 165 with its own calculations to determine the authenticity of the supply item follower component 165).

In the above implementations/embodiments, the various components are configured as leader/follower components. This is purely optional and other communication busses may be used.

Relatively apparent advantages of the many embodiments include, but are not limited to, providing an authentication system/method which is more difficult to satisfy/replicate due to the increased required processing power and writeable memory (both volatile and non-volatile).

It will be understood that the example applications described herein are illustrative and should not be considered limiting. It will be appreciated that the actions described and shown in the example flowcharts may be carried out or performed in any suitable order. It will also be appreciated that not all of the actions described in FIG. 3 need to be performed in accordance with the example embodiments of the disclosure and/or additional actions may be performed in accordance with other example embodiments of the disclosure.

Many modifications and other embodiments of the disclosure set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Further disclosure is provided below.

Statement 1: A method for determining the authenticity of a component in an electronic device, the method comprising of receiving a seed by a component in the electronic device; storing the seed in a block of non-volatile memory in the component; calculating, by the component, the output of a cryptographic function with the input based on the seed and storing the output in the block of non-volatile memory; iteratively calculating, by the component, the outputs of the cryptographic function wherein for each iteration the input for the cryptographic function is based on the seed and all previous outputs, and for each iteration storing the output in the block of non-volatile memory; and determining the authenticity of the component based on a selected output of the cryptographic function F, the selected output being one of the outputs stored in the block of non-volatile memory.

Statement 2: The method of statement 1, further comprising calculating, by a second component, the output of the cryptographic function with the input based on the seed in the same manner as the calculation by the component; and iteratively calculating, by the second component, the outputs of the cryptographic function wherein for each iteration the input for the cryptographic function is based on the seed and all previous outputs in the same manner as the calculation by the component, wherein the number of iterations of the calculation of the cryptographic function performed by the component is the same as the number of iterations of the calculation of the cryptographic function performed by the second component, and wherein determining the authenticity of the component comprises comparing the selected output of the cryptographic function of the component with the corresponding output of the cryptographic function of the second component to determine if they are the same.

Statement 3: The method of statement 2, wherein upon a determination that the selected output of the cryptographic function of the component is the same as the corresponding output of the cryptographic function of the second component, the component is identified as an authentic component, and wherein upon a determination that the selected output of the cryptographic function of the component is different from the corresponding output of the cryptographic function of the second component, the component is identified as a non-authentic component.

Statement 4: The method of statement 2, wherein the output of the cryptographic function with the input based on the seed is stored in a block of non-volatile memory in the second component.

Statement 5: The method of statement 2, wherein each of the iterative outputs of the cryptographic function with the input being based on the seed and all previous outputs is stored in a block of non-volatile memory in the second component.

Statement 6: The method of statement 2, wherein the component transmits the selected output to the second component, and wherein step of determining the authenticity of the component is carried out by the second component.

Statement 7: The method of statement 2, wherein determining the authenticity of the component comprises of the second component requesting the selected output from the component; upon receiving the request from the second component, the component transmitting the selected output to the second component; and the second component comparing a threshold time with the total time taken to receive the selected output from the component after the request from the second component, wherein upon a determination that the total time is less than or equal to the threshold time, the component is identified as an authentic supply item, and wherein upon a determination that the total time is greater than the threshold time, the component is identified as a non-authentic supply item.

Statement 8: The method of statement 7, wherein upon the component receiving the request from the second component the component retrieves the existing stored selected output which is stored in the block of non-volatile memory of the component.

Statement 9: An electronic device comprising a component, the component configured to receive a seed; store the seed in a block of non-volatile memory in the component; calculate the output of a cryptographic function with the input based on the seed and store the output in the block of non-volatile memory; and iteratively calculate the outputs of the cryptographic function wherein for each iteration the input for the cryptographic function is based on the seed and all previous outputs, and for each iteration store the output in the block of non-volatile memory, wherein the electronic device is configured to determine the authenticity of the component based on a selected output of the cryptographic function F, the selected output being one of the outputs stored in the block of non-volatile memory.

Statement 10: The electronic device of statement 9, further comprising a second component configured to calculate the output of the cryptographic function with the input based on the seed in the same manner as the calculation by the component; and iteratively calculate the outputs of the cryptographic function wherein for each iteration the input for the cryptographic function is based on the seed and all previous outputs in the same manner as the calculation by the component, wherein the number of iterations of the calculation of the cryptographic function performed by the component is the same as the number of iterations of the calculation of the cryptographic function performed by the second component, and wherein determining the authenticity of the component comprises comparing the selected output of the cryptographic function of the component with the corresponding output of the cryptographic function of the second component to determine if they are the same.

Statement 11: The electronic device of statement 10, wherein the second component is configured to store the output of the cryptographic function with the input based on the seed in a block of non-volatile memory in the second component.

Statement 12: The electronic device of statement 10, wherein the second component is configured to store each of the iterative outputs of the cryptographic function with the input being based on the seed and all previous outputs in a block of non-volatile memory in the second component.

Statement 13: The electronic device of statement 10, the component is configured to transmit the selected output to the second component, and wherein step of determining the authenticity of the component is carried out by the second component.

Statement 14: The electronic device of statement 10, wherein the second component is configured to request the selected output from the component; the component is configured to, upon receiving the request from the second component, transmit the selected output to the second component; and the second component is configured to compare a threshold time with the total time taken to receive the selected output from the component after the request from the second component.

Statement 15: The electronic device of statement 14, wherein the component is configured to, upon receiving the request from the second component, retrieve the existing stored selected output which is stored in the block of non-volatile memory of the component.

Statement 16: A method of determining the authenticity of a component in an electronic device using a second component of the electronic device, the method comprising: iteratively calculating, by the second component, a series of outputs of a cryptographic function, wherein for each iteration the input for the cryptographic function is based on all previous outputs of the cryptographic function; the second component requesting a selected output from the component, the selected output corresponding to an output of the iterative calculation of the cryptographic function performed by the second component; upon receiving the request from the second component, the component transmitting the selected output to the second component; and the second component comparing the selected output received from the component with the corresponding selected output calculated by the iterative calculation of the cryptographic function performed by the second component.

Statement 17: The method of statement 16, wherein the second component stores each output of the cryptographic function in a block of non-volatile memory of the second component.

Statement 18: The method of statement 16, comprising iteratively calculating, by the component, the series of outputs of the cryptographic function, wherein for each iteration the input for the cryptographic function is based on all previous outputs of the cryptographic function, and wherein for each iteration the component stores each output of the cryptographic function in a block of non-volatile memory of the component.

Statement 19: The method of statement 18, wherein upon the component receiving the request from the second component the component retrieves the existing stored selected output which is stored in the block of non-volatile memory of the component.

Statement 20: The method of statement 16, further comprising the second component comparing a threshold time with the total time taken to receive the selected output from the component after the request from the second component, wherein upon a determination that the total time is less than or equal to the threshold time, the component is identified as an authentic component, and wherein upon a determination that the total time is greater than the threshold time, the component is identified as a non-authentic component.

What is claimed is:

1. A method for determining the authenticity of a supply item in an imaging device, the method comprising:
    receiving, by a supply item follower component in the supply item communicatively connected to an imaging device leader component in the imaging device, a seed;
    storing the seed in a block of non-volatile memory in the supply item follower component;
    calculating, by the supply item follower component, an output of a cryptographic function with the input based on the seed and storing the output in the block of non-volatile memory;
    iteratively calculating, by the supply item follower component, the outputs of the cryptographic function wherein for each iteration the input for the cryptographic function is based on the seed and all previous outputs, and for each iteration storing the output in the block of non-volatile memory; and
    determining the authenticity of the supply item based on a selected output of the cryptographic function of the supply item follower component, the selected output being one of the outputs stored in the block of non-volatile memory,
    the method further comprising:
    calculating, by an imaging device component in the imaging device, the output of the cryptographic function based on the seed in the same manner as the calculation by the supply item follower component, and storing the output in a block of non-volatile memory in the imaging device component; and
    iteratively calculating, by the imaging device component, the outputs of the cryptographic function wherein for each iteration the input for the cryptographic function is based on the seed and all previous outputs in the same manner as the calculation by the supply item follower component, and for each iteration storing the output in the block of non-volatile memory of the imaging device component,
    wherein the number of iterations of the calculation of the cryptographic function performed by the supply item follower component is the same as the number of iterations of the calculation of the cryptographic function performed by the imaging device component, and
    wherein determining the authenticity of the supply item comprises comparing the selected output of the cryptographic function of the supply item follower component with the corresponding output of the cryptographic function of the imaging device component to determine if they are the same.

2. The method of claim 1, wherein the imaging device component is an imaging device follower component in the imaging device communicatively connected to the imaging device leader component.

3. The method of claim 1, wherein the imaging device component is the imaging device leader component.

4. The method of claim 1, wherein upon a determination that the selected output of the cryptographic function of the supply item follower component is the same as the corresponding output of the cryptographic function of the imaging device component, the supply item is identified as an authentic supply item, and wherein upon a determination that the selected output of the cryptographic function of the supply item follower component is different from the corresponding output of the cryptographic function of the imaging device component, the supply item is identified as a non-authentic supply item.

5. The method of claim 1, wherein determining the authenticity of the supply item comprises:
    the imaging device component requesting the selected output from the supply item follower component;
    upon receiving the request from the imaging device component, the supply item follower component transmitting the selected output to the imaging device component; and
    the imaging device component comparing a threshold time with the total time taken to receive the selected output from the supply item follower component after the request from the imaging device component, wherein upon a determination that the total time is less than or equal to the threshold time, the supply item is identified as an authentic supply item, and wherein upon a determination that the total time is greater than the threshold time, the supply item is identified as a non-authentic supply item.

6. The method of claim 5, wherein upon the supply item follower component receiving the request from the imaging device component the supply item follower component retrieves the existing stored selected output which is stored in the block of non-volatile memory of the supply item follower component.

7. The method of claim 1, wherein iteratively calculating, by the supply item follower component, the outputs of the cryptographic function stops when the block of non-volatile memory in the supply item follower component is full.

8. The method of claim 1, wherein iteratively calculating, by the supply item follower component, the outputs of the cryptographic function comprises looping around to start a new chain when the block of non-volatile memory in the supply item follower component is full.

9. The method of claim 1, wherein the cryptographic function is one of a hash function, a salted hash function, a keyed-hash message authentication code, and an encryption function.

10. The method of claim 1, wherein the imaging device leader component sends an authentication request to the supply item follower component triggering it to perform the calculations.

11. The method of claim 1, wherein the supply item follower component sends an encryption of the selected output of the cryptographic function to the imaging device leader component.

12. The method of claim 1, further comprising the supply item follower component changing the size of the block of non-volatile memory in the supply item follower component.

13. The method of claim 1, wherein the imaging device component generates a new seed periodically.

14. The method of claim 1, wherein the imaging device component generates a new seed when the supply item is detected in the imaging device.

15. The method of claim 1, wherein the imaging device leader component generates a new seed periodically.

16. The method of claim 1, wherein the imaging device leader component generates a new seed when the supply item is detected in the imaging device.

17. The method of claim 1, wherein the calculations of cryptographic function are hardware accelerated in the supply item follower component.

18. An imaging system comprising:
    an imaging device having an imaging device leader component; and
    a supply item having a supply item follower component communicatively connectable to the imaging device leader component, the supply item follower component being configured to:
    receive a seed;
    store the seed in a block of non-volatile memory in the supply item follower component;
    calculate the output of a cryptographic function with the input of the seed and store the output in the block of non-volatile memory; and
    iteratively calculate the outputs of the cryptographic function wherein for each iteration the input for the cryptographic function is the seed and all previous outputs, and for each iteration store the output in the block of non-volatile memory,
    wherein the imaging device is configured to determine the authenticity of the supply item based on a selected output of the cryptographic function of the supply item follower component, the selected output being one of the outputs stored in the block of non-volatile memory,
    wherein the imaging device further comprises an imaging device component, the imaging device component being configured to:
    calculate the output of the cryptographic function with the input of the seed and store the output in a block of non-volatile memory in the imaging device component; and
    iteratively calculate the outputs of the cryptographic function wherein for each iteration the input for the cryptographic function is the seed and all previous outputs, and for each iteration store the output in the block of non-volatile memory of the imaging device component,
    wherein the number of iterations of the calculation of the cryptographic function performed by the supply item follower component is the same as the number of iterations of the calculation of the cryptographic function performed by the imaging device component, and
    wherein determining the authenticity of the supply item comprises comparing the selected output of the cryptographic function of the supply item follower component with the corresponding output of the cryptographic function of the imaging device component to determine if they are the same.

* * * * *